United States Patent Office 2,904,483
Patented Sept. 15, 1959

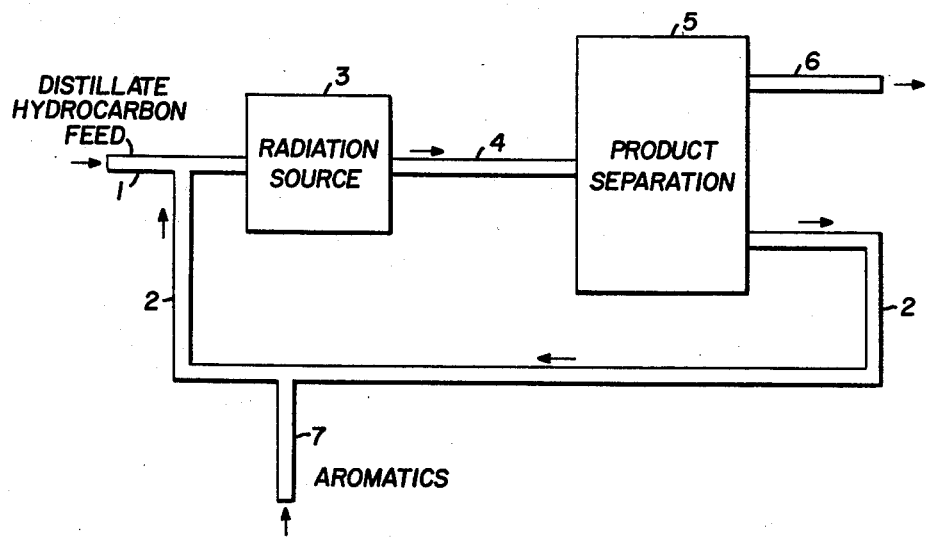
Robert B. Long
Henry J. Hibshman   Inventors
By L. A. Stumbeck   Attorney

2,904,483

HYDROCARBON RADIOCHEMICAL REACTIONS

Robert B. Long, Wanamassa, and Henry J. Hibshman, Plainfield, N.J., assignors to Esso Research and Engineering Company, a corporation of Delaware Application June 1, 1956, Serial No. 588,897

5 Claims. (Cl. 204—154)

The present invention relates to the conversion of hydrocarbons by high intensity ionizing radiation. It is more particularly concerned with controlling the conversion and selectivity of radiochemical hydrocarbon conversion processes.

The present invention proposes an improved radiation induced hydrocarbon conversion process wherein a distillate hydrocarbon reactant is exposed to high intensity ionizing radiation comprising neutrons and gamma rays, and converted to more valuable products. The improvement of this invention comprises adding to the hydrocarbon reactant an aromatic diluent, and controlling the extent of conversion or severity, and the selectivity of the reaction, responsive to the concentration of aromatics in the admixture.

It had been proposed to convert hydrocarbons, particularly petroleum fractions, by exposure to high intensity radiation derived from nuclear reactions or radioactive materials. Under the influence of radiation, a number of desirable conversion reactions occur, including desulfurization, dehydrogenation, polymerization, hydrogenation, polymerization, hydrogenation, isomerization, aromatization, alkylation and cracking. The use of radiation, generally speaking, permits lower temperatures to be used whereby equilibria favorable to the desired products, heretofore not attainable, can be achieved.

The radiation source is preferably a nuclear reactor, but may comprise radiation from isotopes and particle accelerators. The radiation can comprise uncharged (neutrons, gamma and X-rays), or charged (alpha, beta, deuterons, protons) particles. If a nuclear reactor is used as a radiation source, it may be convenient to also use the reactor for other purposes such as power generation, breeding of fissionable material, other conversion processes, etc.

Certain materials can be added to the hydrocarbon reactants to control or effect the reaction. Liquids such as water and solvents; inert solids such as mullite or metal particles; catalysts such as silica-alumina or platinum, or cobalt molybdate distended on a suitable porous carrier; and secondary radiation sources such as lithium, boron, beryllium, cadmium, carried on suitable materials, in suspension or as compounds, can be used.

It has now been found that radiation induced hydrocarbon conversion reactions can readily and effectively be controlled responsive to the concentration of aromatic ring structures in the reactants. According to this invention, a highly aromatic diluent is added in controlled amounts to a hydrocarbon distillate reactant being converted by exposure to radiation, and the degree of conversion and selectivity of the reaction is controlled responsive to the concentration and/or structure of aromatics in the reaction mixture.

This invention is particularly useful when control of the radiation intensity, such as from a nuclear reactor, is inconvenient or impossible. This might occur when the reactor was designed for multi-purpose use, or the original hydrocarbon reaction space was designed for a different type of reaction. This invention also makes it convenient to accommodate fluctuations in the distillate feed composition without materially changing other processing conditions.

It has been found that by proper control of the aromatic content of the reaction mixture, the severity of the hydrocarbon conversion can be substantially increased without undue losses to gas and coke because of excessive "thermal" cracking. For example, in the cracking of gas oils by means of irradiation, the yield of gasoline can be substantially increased by the controlled addition of aromatics. In the dehydrogenation of paraffins in a nuclear reactor, the product molecular weight can be controlled by adding the proper amounts of aromatics.

This invention is primarily applicable to the conversion of petroleum distillates having a low aromatic content, i.e., having an aromatic ring content below 50 wt. percent, preferably below 10 wt. percent, so that the hydrocarbon reaction is properly responsive to the addition of aromatics. It is also primarily suited for liquid phase reactions where, because of the proximity of molecules, the aromatics present can exert their beneficial protecting influence. It is also applicable, however, to wholly or partially vapor phase conversions, but preferably the pressure is sufficient to maintain substantially liquid phase conditions.

This invention is concerned with the concentration aromatic ring structures, e.g., benzene, anthracene, phenanthrene, and homologues or derivatives thereof, present in the reactants. These can be derived from any convenient source. Pure compounds can, of course, be used. Aromatics of interest in this invention include, besides simple ring structures like benzene, alkylated ring compounds such as toluene and xylenes, multi-ring structures such as naphthalene, phenanthrene and anthracene, and aromatics that may contain one or more only partially condensed rings, such as tetralin. It is desirable to choose a compound that has hydrogen donor properties. Broadly, these are the aromatic-naphthenes. These aromatic-naphthenes, under the proper conditions, partially condense, giving up hydrogen to the free radicals formed from the feed stock during the conversion. The partially condensed ring aromatic-naphthene structures can be recovered from the products and partially hydrogenated to recreate the hydrogen donor material.

The aromatic diluent is, however, preferably obtained from available refinery streams that contain a sustantial proportion of aromatic compounds, or compounds that will readily reduce to aromatic ring structures under reaction conditions. The aromatic diluent used in this invention contains initially over 30, preferably over 50 wt. percent of aromatic ring structures. The aromatic diluent can have a boiling range the same as, or above or below, that of the hydrocarbon reactant. The boiling range preferably differs from that of the distillate reactant to permit easier recovery, as by distillation, for recycle.

The concentration of the aromatic material depends in part upon the type or structure of the aromatic material. For example, benzene has a different influence on a reaction than anthracene does. Thus, control of the reaction can also be obtained by control of the type of aromatic in the reactants.

Admirable sources of the aromatics added to the distillate feed stream according to this invention include catalytic cycle stocks, hydroformates, thermally and steam cracked materials, aromatic concentrates separated therefrom, or aromatic concentrates separated from virgin materials such as lube oil base stocks by extraction using phenol, furfural, $SO_2$ ozone, etc. or by adsorption, e.g., with molecular sieves, activated carbon or silica gel, or by distillation, crystallization, etc.

It is preferred in this invention to recover at least a part, if not all, of the aromatics from the reaction products by conventional means such as distillation and extraction, and to recycle them. In some cases, a portion, but not all, of the aromatic ring structures can be obtained from the distillate hydrocarbon feed itself.

The feed material to be converted may comprise any distillate material such as virgin and cracked naphthas and gas oils, and preferably excludes materials non-vaporizable at atmospheric pressure without cracking. Materials boiling in the range of 100 to 600° F. are especially preferred. Select boiling ranges of materials may be used to obtain particular products. Thus, a heavy virgin naphtha can be exposed to conditions of hydroforming in the presence of irradiation to obtain a high octane product. The feed stock may be of a particular composition. Thus, the paraffinic constituents separated from a naphtha to leave a highly aromatic, high octane product may be converted according to this invention to obtain further quantities of high octane material.

The following description of the drawing attached to and forming a part of this specification serves to illustrate this invention.

The distillate hydrocarbon to be converted is admitted to the process by line 1. The aromatic diluent material is supplied by line 2.

The amount of aromatic diluent, or more particularly of the aromatic ring structures, added to the feed is controlled to control the subsequent conversion reaction. The amount to be added can be determined in any convenient method, as by observing the composition, distribution, or yield of the products, or by monitoring the admixture entering the reaction zone. This can be done by continuous analysis, whereby the product quality is continuously measured and/or the aromatic concentration of the feed admixture is continuously measured by spectroscopic techniques (refractive index, ultra violet or infra red spectrophotometry, etc.). Preferably the aromatic ring content of the admixture is in the range of 5 to 50 wt. percent.

The resulting mixture is then exposed to high intensity ionizing irradiation in radiation source 3. See "Principles of Nuclear Chemistry," Williams, D. Van Nostrand Company, Inc., New York, N.Y., 1950, page 230, wherein it is shown that in order for radiation to be considered ionizing it must have an energy of at least 32 electron volts. For example, this source can comprise an atomic pile and the admixture can be simply passed through the pile in suitable conduits. It may flow around or through the core of the reactor, and in some cases, the hydrocarbon material can serve as a moderator. Suitable conditions of pressure and temperature are maintained during the conversion.

Another convenient source of radiation is the "atomic waste" obtained from nuclear reactors or atomic piles. This atomic waste can be suitably enclosed or concentrated as an underground storage area, and the hydrocarbon mixture can be passed through or around the waste material.

The treated material is removed by line 4 and passed to a suitable product separation zone 5. This zone can comprise, for example, a distillation zone, a solvent extraction zone, and/or an absorption zone. The desired products are removed from zone 5 by line 6 and preferably, but not necessarily, an aromatic concentrate is recovered and removed by line 2 for recycle to the feed stream as indicated. Make-up aromatic diluent, if necessary, is supplied to line 2 by line 7.

The following examples will help this invention to be more fully understood.

EXAMPLE 1

In this example, cetane (n-hexadecane) in admixture with alpha-methyl naphthalene was irradiated in an atomic pile. The atomic pile employed was the air-cooled natural uranium, graphite-moderated research reactor of the Brookhaven National Laboratories. This research reactor facility has been fully described in the publication entitled "Brookhaven National Laboratory, Research Reactor Facility, Irradiation Services and Radioisotopes," published in December 1955, by Associated Universities, Inc. This pile was operating at a total power of 24 megawatts at the time of these experiments which gave the following flux distribution at the point where the oils were irradiated:

Slow neutron flux (.03 ev.) = $2.5 \times 10^{12}$ neutrons/cm.$^2$/sec.

Fast neutron flux (>0.6 mev.) = $0.6 \times 10^{12}$ neutrons/cm.$^2$/sec.

Fast neutron flux (>1 mev.) = $0.5 \times 10^{12}$ neutrons/cm.$^2$/sec.

Gamma intensity = $1.6 \times 10^6$ roentgens/hr.

The core of the reactor was approximately a 20 ft. x 20 ft. x 20 ft. lattice of graphite with horizontal 1-inch diameter aluminum-clad uranium rods spaced evenly throughout the reactor extending from the north to south faces of the core. This core was completely surrounded by 10 ft. of concrete shielding. The sample holes used for irradiation were horizontal 4-inch x 4-inch square holes extending through the 10 ft. concrete shield and into the carbon core for a distance of 10 ft. from the core face. Normal operating temperatures in the experimental hole were from 350° to 400° F.

The irradiations were carried out as follows:

Three one-quart samples were irradiated at one time by placing them in three vented aluminum containers (3-inch diameter cylinders) which were mounted on a horizontal aluminum sled. The vents (of aluminum tubing) extended from the vapor space in the containers out of the core and through the shielding to a sample receiver system where gases and condensable liquids could be metered and collected. The samples were inserted in the pile during scheduled shutdowns, irradiated for periods of 10 days, and then were withdrawn from the pile during the following shutdown.

The results of these tests are shown in Table I.

Table I

|  | (1) | (2)[a] | (3) |
|---|---|---|---|
| Weight percent alpha methyl naphthalene in cetane | 15 | 75 | 0 |
| Weight percent cetane reacted | 66 | 46 | 100 |
| Gas composition: |  |  |  |
| Mole percent $H_2$ | 85 | 79 | 87 |
| $H_2$-free hydrocarbons— |  |  |  |
| $C_1$ | 8.9 | 15.3 | 9.1 |
| $C_2$ | 36.7 | 55.1 | 33.9 |
| $C_3$ | 17.7 | 17.8 | 17.9 |
| $C_4$ | 17.9 | 8.1 | 16.2 |
| $C_5$ | 12.8 | 2.9 | 14.8 |
| Olefin/paraffin ratio— |  |  |  |
| $C_2$ | 3.7 | 4.7 | 2.3 |
| $C_3$ | 1.1 | 0.9 | 1.5 |
| $C_4$ | 1.2 | 0.4 | 1.1 |
| $C_5$ | 0.5 | 0.8 | 0.5 |
| Iso/normal paraffin ratio— |  |  |  |
| $C_4$ | 0.5 | 2.2 | 0.1 |
| $C_5$ | 2.2 | 0 | 0.5 |
| Cracked liquid products, 0/430° F.: |  |  |  |
| Weight percent on feed | 0.7 | 0.5 | 0 |
| Vol. percent aromatics | 9.2 | 20.2 |  |
| Vol. percent olefins | 31.3 | 32.6 |  |
| Vol. percent saturates | 59.5 | 47.2 |  |
| Bromine number | 20.8 | 27 |  |
| Cracked liquid products, 430/540° F.: |  |  |  |
| Weight percent on feed | 4.6 | 28 | 0 |
| Vol. percent aromatics | 32 |  |  |
| Vol. percent olefins | 29 |  |  |
| Vol. percent saturates | 39 |  |  |
| Bromine number | 15.4 |  |  |
| Lube oil, 700/900° F.: |  |  | 0 |
| Weight percent on feed | 10.4 | 13 |  |
| Viscosity, SSU at 210 | 39.5 | 141 |  |
| Viscosity index | 131 | 37 |  |
| Solid polymer, weight percent on feed | 0 | 0 | [b] 100 |

[a] Irradiated 14 days.
[b] Rubber-like solid.

EXAMPLE 2

The following example is concerned with conversions induced by $Co^{60}$ gamma radiation on a variety of feed materials. These were: cetane, benzene, toluene, alpha methyl naphthalene, decahydro naphthalene, 900° F.+Bachaquero residiuum, 875/1200° F. Bachaquero gas oil, 600/700° F. West Texas gas oil, 600/676° F. South Louisiana gas oil, n-heptane. These materials were irradiated, at room temperature, by the $Co^{60}$ gamma radiation (2.50 mev. per disintegration) from a 3000 curie Cobalt-60 source. Reactivities on a relative basis, measured for a wide variety of feeds for varying aromatic concentration, were as follows:

*Table II*

| Weight percent condensed ring aromatics in irradiated feed | Relative reactivity based on unity for zero aromatic content |
|---|---|
| None | 1 |
| 20% | 0.8 |
| 50% | 0.2 |
| 100% | 0.02 |

These two examples show that a change in the concentration of the aromatic ring structures in the mixture undergoing irradiation has a profound effect upon the degree of conversion and the selectivity. This invention proposes that by controlling the conversion reaction responsive to the aromatic ring content of the reaction mixture, greatly improved performance is obtained.

Having described this invention, what is sought to be protected by Letters Patent is succinctly set forth in the following claims.

What is claimed is:

1. In a radiation induced hydrocarbon conversion process wherein a distillate hydrocarbon reactant having an aromatic ring content below 10 weight percent is exposed to high intensity ionizing radiation having an energy of at least 32 electron volts and converted, the improvement which comprises adding to said reactant prior to irradiation thereof an appreciable portion of an aromatic diluent containing over 30 weight percent of aromatic ring structures such that the concentration of aromatic rings in the resulting admixture is in the range of 5 to 50 weight percent, and moderating and controlling the conversion of said distillate hydrocarbon reactant by the amount of said diluent that is added.

2. The process of claim 1 wherein at least a portion of said aromatic diluent is obtained by separation of the irradiated product.

3. The process of claim 1 wherein said conversion process is carried out substantially in liquid phase.

4. The process of claim 1 wherein said aromatic diluent comprises substantial proportions of aromatic-naphthenes having hydrogen donor properties.

5. The process of claim 1 wherein said reactant boils in the range of 100° to 600° F.

References Cited in the file of this patent

UNITED STATES PATENTS

| 1,897,617 | Mekler | Feb. 14, 1933 |
| 2,350,330 | Remy | June 6, 1944 |
| 2,743,223 | McClinton et al. | Apr. 24, 1956 |

OTHER REFERENCES

Comptes Rendus, vol. 228 (1949), pp. 1490–1492.
Comptes Rendus, vol. 229 (1949), pp. 827–829.